United States Patent
Gudi et al.

(10) Patent No.: US 10,365,643 B2
(45) Date of Patent: Jul. 30, 2019

(54) SYSTEM RELIABILITY AND OPERATING LIFE ENHANCEMENT IN FIELD THROUGH THERMAL PROFILING

(71) Applicant: Honeywell International Inc., Morris Plains, NJ (US)

(72) Inventors: Balakrishna G. Gudi, Bangalore (IN); Shripad Pande, Hyderbad (IN); Nagaraja Sundaresh, Hyderbad (IN); Michael D. Carney, Havertown, PA (US)

(73) Assignee: Honeywell International Inc., Morris Plains, NJ (US)

( * ) Notice: Subject to any disclaimer, the term of this patent is extended or adjusted under 35 U.S.C. 154(b) by 0 days.

(21) Appl. No.: 15/384,269

(22) Filed: Dec. 19, 2016

(65) Prior Publication Data

US 2018/0174425 A1    Jun. 21, 2018

(51) Int. Cl.
| | | |
|---|---|---|
| *G05B 19/042* | (2006.01) | |
| *G06F 1/20* | (2006.01) | |
| *G05B 23/02* | (2006.01) | |
| *G05B 11/01* | (2006.01) | |

(52) U.S. Cl.
CPC ....... *G05B 23/0235* (2013.01); *G05B 19/042* (2013.01); *G06F 1/20* (2013.01); *G05B 11/01* (2013.01); *G05B 2219/21156* (2013.01)

(58) Field of Classification Search
CPC . G08B 21/182; G05B 19/0423; G06Q 10/087
USPC ......... 700/229, 276; 702/130, 188; 709/220; 710/33
See application file for complete search history.

(56) References Cited

U.S. PATENT DOCUMENTS

| | | | |
|---|---|---|---|
| 6,397,322 B1 | 5/2002 | Voss | |
| 7,259,953 B2 | 8/2007 | Salerno | |
| 9,858,795 B1 * | 1/2018 | Camilo Gomes | .... G08B 21/182 |
| 2003/0038728 A1 * | 2/2003 | Striano | ................ G05B 19/054 340/815.4 |
| 2005/0165586 A1 * | 7/2005 | Moore | ..................... G06F 1/206 702/188 |
| 2005/0286220 A1 * | 12/2005 | Moore | ............... H05K 7/20836 361/679.46 |
| 2008/0300818 A1 * | 12/2008 | Brey | .................. H05K 7/20745 702/130 |
| 2009/0287456 A1 * | 11/2009 | Tran | ........................ H04L 67/12 702/188 |
| 2011/0084839 A1 * | 4/2011 | Groth | ................... G06Q 10/087 340/572.1 |
| 2014/0047137 A1 * | 2/2014 | Mathason | .......... G05B 19/0423 710/33 |
| 2015/0253028 A1 * | 9/2015 | Masuyama | ............ G05B 15/02 700/276 |

(Continued)

*Primary Examiner* — Albert K Wong

(57) ABSTRACT

A system includes an input/output module (IOM) configured to interface with a field device. The IOM includes a terminal block including a plurality of inputs or outputs, each of the inputs or outputs configured to send and receive signals to and from the field device. The IOM also includes a plurality of temperature sensors, each of the plurality of temperature sensor configured to measure a temperature in a vicinity of the temperature sensor. The IOM also includes a connector configured to transmit the temperature of each of the plurality of temperature sensors to a processing device.

18 Claims, 5 Drawing Sheets

← Towards Backplane      Towards Field →

(56) References Cited

U.S. PATENT DOCUMENTS

2015/0256386 A1* 9/2015 Palmer .................. F24F 11/006
709/220
2015/0279193 A1* 10/2015 Federspiel ............. G08B 31/00
340/517
2016/0094898 A1* 3/2016 Primm ..................... H04Q 9/00
340/870.09

* cited by examiner

SYSTEM RELIABILITY AND OPERATING LIFE ENHANCEMENT IN FIELD THROUGH THERMAL PROFILING

TECHNICAL FIELD

This disclosure is generally directed to thermal profiling. More specifically, this disclosure is directed to system reliability and operating life enhancement in field through thermal profiling using input/output module (IOM) thermal sensors.

BACKGROUND

Industrial control and automation systems are often used to automate large and complex industrial processes. These types of systems routinely include networks that facilitate communications with a wide range of industrial field devices. The industrial control and automation system can include a process control system that consists of several modules delivering different functions. For example, a power supply unit (PSU) sources power, a central processing unit (CPU) module performs computing, an input module reads an input, and an output module drives an output. System can have fewer modules or several modules in different architecture, such as those that are din rail mount based, rack based, cabinet based, and the like.

Racks or cabinets are used in the process industry. Most of the control system electronics is hosted inside these racks and then eventually in a cabinet. Generally these are kept in a controlled environment for managing the entire plant's process control. These systems are not only expensive, they need to be reliable and be available all the time to minimize down time and damages in case of process emergency.

SUMMARY

This disclosure provides system reliability and operating life enhancement in field through thermal profiling using input/output module (IOM) thermal sensors.

A first example embodiment of this disclosure provides a system. The system includes an IOM configured to interface with a field device. The IOM includes a terminal block including a plurality of inputs or outputs, each of the inputs or outputs configured to send and receive signals to and from the field device. The IOM also includes a plurality of temperature sensors, each of the plurality of temperature sensor configured to measure a temperature in a vicinity of the temperature sensor. The IOM also includes a connector configured to transmit the temperature of each of the plurality of temperature sensors to a processing device.

A second example embodiment of this disclosure provides a method. The method includes receiving, from an IOM, a plurality of temperature measurements. The method also includes comparing each of the plurality of temperature measurements to a threshold. The method also includes responsive to a temperature measurement exceeding the threshold, providing a report indicating the exceeded threshold.

A third example embodiment of this disclosure provides an IOM for interfacing with a field device. The IOM includes a terminal block including a plurality of inputs or outputs, each of the inputs or outputs configured to send and receive signals to and from the field device. The IOM also includes a plurality of temperature sensors, each of the plurality of temperature sensors configured to measure a temperature in a vicinity of the temperature sensor. The IOM also includes a connector configured to transmit the temperature of each of the plurality of temperature sensors to a processing device.

BRIEF DESCRIPTION OF THE DRAWINGS

For a more complete understanding of this disclosure and its features, reference is now made to the following description, taken in conjunction with the accompanying drawings, in which.

DETAILED DESCRIPTION

FIGS. 1 through 6, discussed below, and the various examples used to describe the principles of the present invention in this patent document are by way of illustration only and should not be construed in any way to limit the scope of the invention. Those skilled in the art will understand that the principles of the present invention may be implemented in any suitable manner and in any type of suitably arranged device or system.

Figure 1:
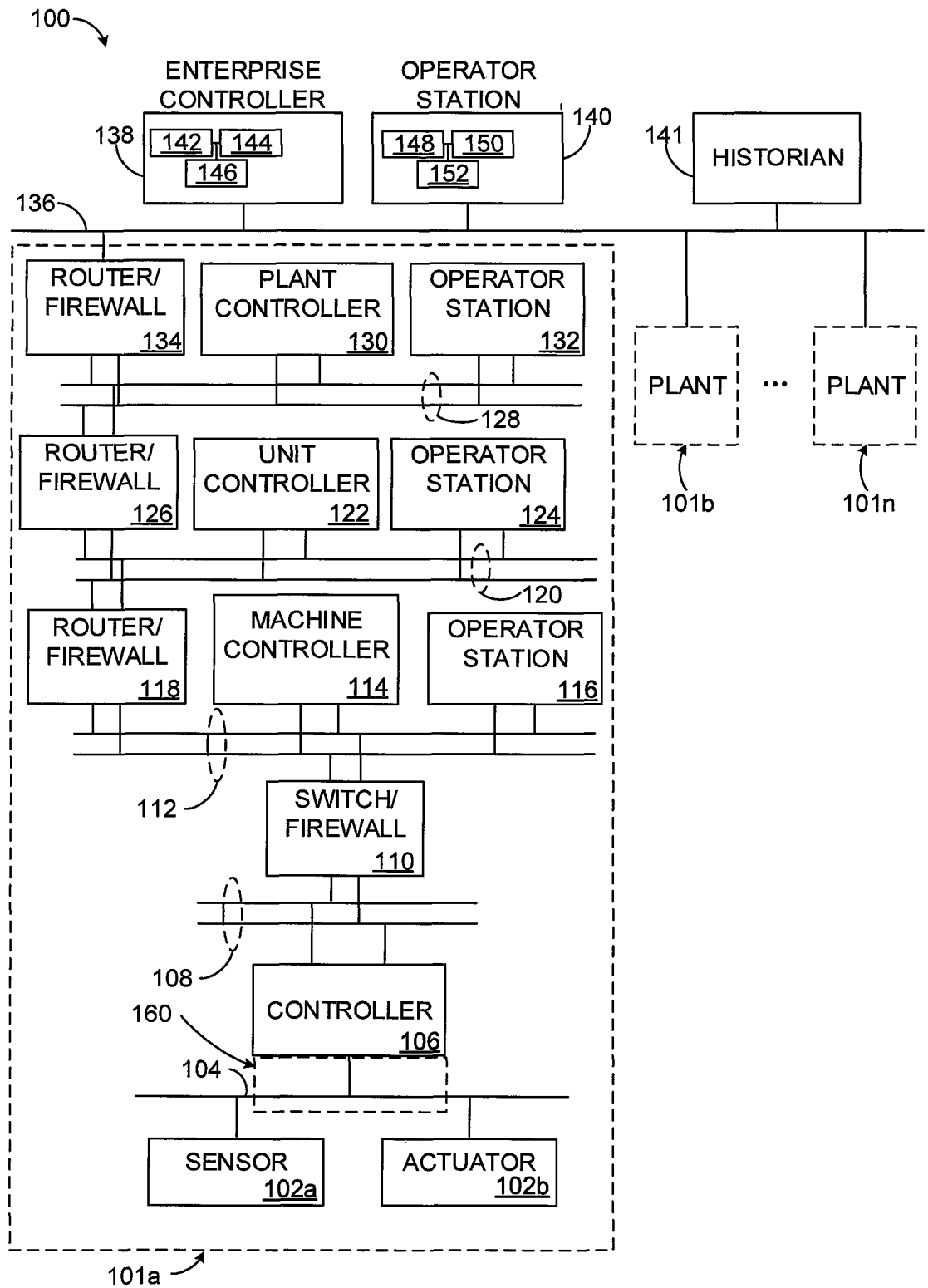
FIG. 1 illustrates an example industrial process control and automation system and related details according to this disclosure.

FIG. 1 illustrates an example industrial process control and automation system 100 and related details according to this disclosure. As shown in FIG. 1, the system 100 includes various components that facilitate production or processing of at least one product or other material. For instance, the system 100 is used here to facilitate control over components in one or multiple plants 101a-101n. Each plant 101a-101n represents one or more processing facilities (or one or more portions thereof), such as one or more manufacturing facilities for producing at least one product or other material. In general, each plant 101a-101n may implement one or more processes and can individually or collectively be referred to as a process system. A process system generally represents any system or portion thereof configured to process one or more products or other materials in some manner.

In FIG. 1, the system 100 is implemented using the Purdue model of process control. In the Purdue model, "Level 0" may include one or more sensors 102a and one or more actuators 102b. The sensors 102a and actuators 102b represent components in a process system that may perform any of a wide variety of functions. For example, the sensors 102a could measure a wide variety of characteristics in the process system, such as temperature, pressure, or flow rate. Also, the actuators 102b could alter a wide variety of characteristics in the process system. The sensors 102a and actuators 102b could represent any other or additional components in any suitable process system. Each of the sensors 102a includes any suitable structure for measuring one or more characteristics in a process system. Each of the actuators 102b includes any suitable structure for operating on or affecting one or more conditions in a process system.

At least one network 104 is coupled to the sensors 102a and actuators 102b. The network 104 facilitates interaction with the sensors 102a and actuators 102b through signals. The signals can report measurements and provide power to the sensors 102a and actuators 102b. For example, the network 104 could transport measurement data from the sensors 102a and provide control signals to the actuators 102b. The network 104 could represent any suitable network or combination of networks. As particular examples, the network 104 could represent an Ethernet network, an electrical signal network (such as a HART or FOUNDATION FIELDBUS network), a pneumatic control signal network, or any other or additional type(s) of network(s).

In the Purdue model, "Level 1" may include one or more controllers 106, which are coupled to the network 104. Among other things, each controller 106 may use the measurements from one or more sensors 102a to control the operation of one or more actuators 102b. For example, a controller 106 could receive measurement data from one or more sensors 102a and use the measurement data to generate control signals for one or more actuators 102b. Each controller 106 includes any suitable structure for interacting with one or more sensors 102a and controlling one or more actuators 102b. Each controller 106 could, for example, represent a multivariable controller, such as a Robust Multivariable Predictive Control Technology (RMPCT) controller, or other type of controller implementing model predictive control (MPC) or other advanced predictive control (APC). As a particular example, each controller 106 could represent a computing device running a real-time operating system.

Two networks 108 are coupled to the controllers 106. The networks 108 facilitate interaction with the controllers 106, such as by transporting data to and from the controllers 106. The networks 108 could represent any suitable networks or combination of networks. As particular examples, the networks 108 could represent a pair of Ethernet networks or a redundant pair of Ethernet networks, such as a FAULT TOLERANT ETHERNET (FTE) network from HONEYWELL INTERNATIONAL INC.

At least one switch/firewall 110 couples the networks 108 to two networks 112. The switch/firewall 110 may transport traffic from one network to another. The switch/firewall 110 may also block traffic on one network from reaching another network. The switch/firewall 110 includes any suitable structure for providing communication between networks, such as a HONEYWELL CONTROL FIREWALL (CF9) device. The networks 112 could represent any suitable networks, such as a pair of Ethernet networks or an FTE network.

In the Purdue model, "Level 2" may include one or more machine-level controllers 114 coupled to the networks 112. The machine-level controllers 114 perform various functions to support the operation and control of the controllers 106, sensors 102a, and actuators 102b, which could be associated with a particular piece of industrial equipment (such as a boiler or other machine). For example, the machine-level controllers 114 could log information collected or generated by the controllers 106, such as measurement data from the sensors 102a or control signals for the actuators 102b. The machine-level controllers 114 could also execute applications that control the operation of the controllers 106, thereby controlling the operation of the actuators 102b. In addition, the machine-level controllers 114 could provide secure access to the controllers 106. Each of the machine-level controllers 114 includes any suitable structure for providing access to, control of, or operations related to a machine or other individual piece of equipment. Each of the machine-level controllers 114 could, for example, represent a server computing device running a MICROSOFT WINDOWS operating system. Although not shown, different machine-level controllers 114 could be used to control different pieces of equipment in a process system (where each piece of equipment is associated with one or more controllers 106, sensors 102a, and actuators 102b).

One or more operator stations 116 are coupled to the networks 112. The operator stations 116 represent computing or communication devices providing user access to the machine-level controllers 114, which could then provide user access to the controllers 106 (and possibly the sensors 102a and actuators 102b). As particular examples, the operator stations 116 could allow users to review the operational history of the sensors 102a and actuators 102b using information collected by the controllers 106 and/or the machine-level controllers 114. The operator stations 116 could also allow the users to adjust the operation of the sensors 102a, actuators 102b, controllers 106, or machine-level controllers 114. In addition, the operator stations 116 could receive and display warnings, alerts, or other messages or displays generated by the controllers 106 or the machine-level controllers 114. Each of the operator stations 116 includes any suitable structure for supporting user access and control of one or more components in the system 100. Each of the operator stations 116 could, for example, represent a computing device running a MICROSOFT WINDOWS operating system.

At least one router/firewall 118 couples the networks 112 to two networks 120. The router/firewall 118 includes any suitable structure for providing communication between networks, such as a secure router or combination router/firewall. The networks 120 could represent any suitable networks, such as a pair of Ethernet networks or an FTE network.

In the Purdue model, "Level 3" may include one or more unit-level controllers 122 coupled to the networks 120. Each unit-level controller 122 is typically associated with a unit in a process system, which represents a collection of different machines operating together to implement at least part of a process. The unit-level controllers 122 perform various functions to support the operation and control of components in the lower levels. For example, the unit-level controllers 122 could log information collected or generated by the components in the lower levels, execute applications that control the components in the lower levels, and provide secure access to the components in the lower levels. Each of the unit-level controllers 122 includes any suitable structure for providing access to, control of, or operations related to one or more machines or other pieces of equipment in a process unit. Each of the unit-level controllers 122 could, for example, represent a server computing device running a MICROSOFT WINDOWS operating system. Although not shown, different unit-level controllers 122 could be used to control different units in a process system (where each unit is associated with one or more machine-level controllers 114, controllers 106, sensors 102a, and actuators 102b).

Access to the unit-level controllers 122 may be provided by one or more operator stations 124. Each of the operator stations 124 includes any suitable structure for supporting user access and control of one or more components in the system 100. Each of the operator stations 124 could, for example, represent a computing device running a MICROSOFT WINDOWS operating system.

At least one router/firewall 126 couples the networks 120 to two networks 128. The router/firewall 126 includes any suitable structure for providing communication between networks, such as a secure router or combination router/firewall. The networks 128 could represent any suitable networks, such as a pair of Ethernet networks or an FTE network.

In the Purdue model, "Level 4" may include one or more plant-level controllers 130 coupled to the networks 128. Each plant-level controller 130 is typically associated with one of the plants 101a-101n, which may include one or more process units that implement the same, similar, or different processes. The plant-level controllers 130 perform various functions to support the operation and control of components in the lower levels. As particular examples, the plant-level controller 130 could execute one or more manufacturing execution system (MES) applications, scheduling applications, or other or additional plant or process control applications. Each of the plant-level controllers 130 includes any suitable structure for providing access to, control of, or operations related to one or more process units in a process plant. Each of the plant-level controllers 130 could, for example, represent a server computing device running a MICROSOFT WINDOWS operating system.

Access to the plant-level controllers 130 may be provided by one or more operator stations 132. Each of the operator stations 132 includes any suitable structure for supporting user access and control of one or more components in the system 100. Each of the operator stations 132 could, for example, represent a computing device running a MICROSOFT WINDOWS operating system.

At least one router/firewall 134 couples the networks 128 to one or more networks 136. The router/firewall 134 includes any suitable structure for providing communication between networks, such as a secure router or combination router/firewall. The network 136 could represent any suitable network, such as an enterprise-wide Ethernet or other network or all or a portion of a larger network (such as the Internet).

In the Purdue model, "Level 5" may include one or more enterprise-level controllers 138 coupled to the network 136. Each enterprise-level controller 138 is typically able to perform planning operations for multiple plants 101a-101n and to control various aspects of the plants 101a-101n. The enterprise-level controllers 138 can also perform various functions to support the operation and control of components in the plants 101a-101n. As particular examples, the enterprise-level controller 138 could execute one or more order processing applications, enterprise resource planning (ERP) applications, advanced planning and scheduling (APS) applications, or any other or additional enterprise control applications. Each of the enterprise-level controllers 138 includes any suitable structure for providing access to, control of, or operations related to the control of one or more plants. Each of the enterprise-level controllers 138 could, for example, represent a server computing device running a MICROSOFT WINDOWS operating system. In this document, the term "enterprise" refers to an organization having one or more plants or other processing facilities to be managed. Note that if a single plant 101a is to be managed, the functionality of the enterprise-level controller 138 could be incorporated into the plant-level controller 130.

Access to the enterprise-level controllers 138 may be provided by one or more operator stations 140. Each of the operator stations 140 includes any suitable structure for supporting user access and control of one or more components in the system 100. Each of the operator stations 140 could, for example, represent a computing device running a MICROSOFT WINDOWS operating system.

Various levels of the Purdue model can include other components, such as one or more databases. The database(s) associated with each level could store any suitable information associated with that level or one or more other levels of the system 100. For example, a historian 141 can be coupled to the network 136. The historian 141 could represent a component that stores various information about the system 100. The historian 141 could, for instance, store information used during production scheduling and optimization. The historian 141 represents any suitable structure for storing and facilitating retrieval of information. Although shown as a single centralized component coupled to the network 136, the historian 141 could be located elsewhere in the system 100, or multiple historians could be distributed in different locations in the system 100.

In particular embodiments, the various controllers and operator stations in FIG. 1 may represent computing devices. For example, each of the controllers could include one or more processing devices 142 and one or more memories 144 for storing instructions and data used, generated, or collected by the processing device(s) 142. Each of the controllers could also include at least one network interface 146, such as one or more Ethernet interfaces or wireless transceivers. Also, each of the operator stations could include one or more processing devices 148 and one or more memories 150 for storing instructions and data used, generated, or collected by the processing device(s) 148. Each of the operator stations could also include at least one network interface 152, such as one or more Ethernet interfaces or wireless transceivers.

The system 100 can have several racks and cabinets with a large amount of wiring to read different types of inputs and to write to outputs. Each rack hosts several Input and Output (I/O) modules (IOMs) 160. Each IOM 160 can dissipate power due to driving or sourcing the power to a targeted device. A portion of the delivered power gets dissipated within the IOM 160 causing a rise in temperature within the IOM 160. Each IOM 160 includes a controller 106 and manages the input and output with one or more sensors 102a or actuators 102b. In one or more examples, the sensors 102a and actuators 102b can be examples of field devices. These field devices are connected to the IOM 160. The IOM 160 can be one of many IOMs connected to the field devices. In another example, there are multiple IOMs that are each connected to a number of different field devices.

The IOMs 160 may be collectively installed into a rack, and multiple racks into a cabinet. An operator may want to monitor the racks and cabinets for their internal temperature. Certain values of temperature for long term can affect the working life and reliability of the modules. There can be several IOMs 160 in a rack and several racks in a cabinet. Distributing the I/Os across modules and racks can allow for the power dissipated inside the module, rack, and/or cabinet to be distributed. Allowing power dissipation to concentrate at one place can lead to an exponential rise in internal temperature due to self-heating. The heating not only affects adjacent modules but also affects the life and reliability of the module in question.

Although FIG. 1 illustrates one example of an industrial process control and automation system 100, various changes may be made to FIG. 1. For example, a control and automation system could include any number of sensors, actuators, controllers, operator stations, networks, servers, communication devices, and other components. In addition, the makeup and arrangement of the system 100 in FIG. 1 is for illustration only. Components could be added, omitted, combined, further subdivided, or placed in any other suitable configuration according to particular needs. Further, particular functions have been described as being performed by particular components of the system 100. This is for illustration only. In general, control and automation systems are highly configurable and can be configured in any suitable manner according to particular needs. In addition, FIG. 1 illustrates an example environment in which racks and cabinets related to an industrial process control and automation system can be monitored for thermal patterns. This functionality can be used in any other suitable system.

Various embodiments of this disclosure provide several different types of IOMs. These modules can be put in a rack and racks in a cabinet to offer an end solution, such as connected to and powering field devices. Some cabinets include fans with sensors inside to monitor the temperature of the cabinet. These temperature sensors may not be part of a process control system and are monitored separately. This gives rise to complexity and yet the detection of undesirable temperatures becomes manual.

Figure 2:
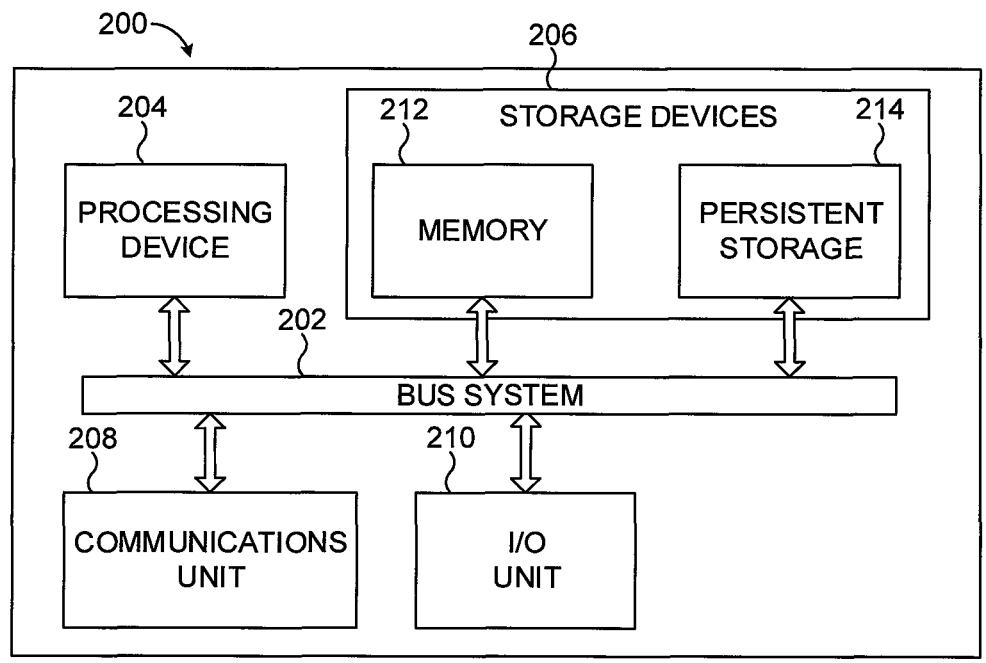
FIG. 2 illustrates an example device for managing input/output module (IOM) temperatures according to this disclosure.

FIG. 2 illustrates an example device 200 for managing IOM temperatures according to this disclosure. The device 200 could represent, for example, one of the processing device(s) 148 or controller 106 in the system 100 of FIG. 1. However, the device 200 could be used in any other suitable system.

As shown in FIG. 2, the device 200 includes a bus system 202, which supports communication between at least one processing device 204, at least one storage device 206, at least one communications unit 208, and at least one input/output (I/O) unit 210. The processing device 204 executes instructions that may be loaded into a memory 212. The processing device 204 may include any suitable number(s) and type(s) of processors or other devices in any suitable arrangement. Example types of processing devices 204 include microprocessors, microcontrollers, digital signal processors, field programmable gate arrays, application specific integrated circuits, and discrete circuitry.

The memory 212 and a persistent storage 214 are examples of storage devices 206, which represent any structure(s) capable of storing and facilitating retrieval of information (such as data, program code, and/or other suitable information on a temporary or permanent basis). The memory 212 may represent a random access memory or any other suitable volatile or non-volatile storage device(s). The persistent storage 214 may contain one or more components or devices supporting longer-term storage of data, such as a ready only memory, hard drive, Flash memory, or optical disc.

The communications unit 208 supports communications with other systems or devices. For example, the communications unit 208 could include a network interface that facilitates communications over at least one Ethernet, HART, FOUNDATION FIELDBUS, cellular, Wi-Fi, universal asynchronous receiver/transmitter (UART), serial peripheral interface (SPI) or other network. The communications unit 208 could also include a wireless transceiver facilitating communications over at least one wireless network. The communications unit 208 may support communications through any suitable physical or wireless communication link(s). The communications unit 208 may support communications through multiple different interfaces, or may be representative of multiple communication units with the ability to communication through multiple interfaces.

The I/O unit 210 allows for input and output of data. For example, the I/O unit 210 may provide a connection for user input through a keyboard, mouse, keypad, touchscreen, or other suitable input device. The I/O unit 210 may also send output to a display, printer, or other suitable output device.

In one or more embodiments of this disclosure, the device 200 receives various temperature readings from temperature sensors on an IOM, such as the IOM 160 as shown in FIG. 1. The device 200 is configured to manage these readings and alert an operator based on various rules and criteria. For example, the operator may have set a maximum temperature threshold. If one of the temperature sensors in the IOM exceeds the maximum threshold, then the device 200 may alert the operator.

Although FIG. 2 illustrates one example of a device 200, various changes may be made to FIG. 2. For example, components could be added, omitted, combined, further subdivided, or placed in any other suitable configuration according to particular needs. Also, computing devices can come in a wide variety of configurations, and FIG. 2 does not limit this disclosure to any particular configuration of computing device.

One or more embodiments of this disclosure provide rack or cabinet level temperature sensors integrated within a process control system for continuous monitoring. These embodiments recognize and take into account that previous sensors are not part of the control system, and therefore appropriate actions cannot be taken in case of an undesirable temperature situation. With prior systems, the outputs that dissipate power within the module, rack, or cabinet cannot be profiled and distributed. This disclosure provides a system and method for enhancing the reliability and operating life of a control system inside a rack or cabinet by profiling the thermal spread within.

Figure 3:
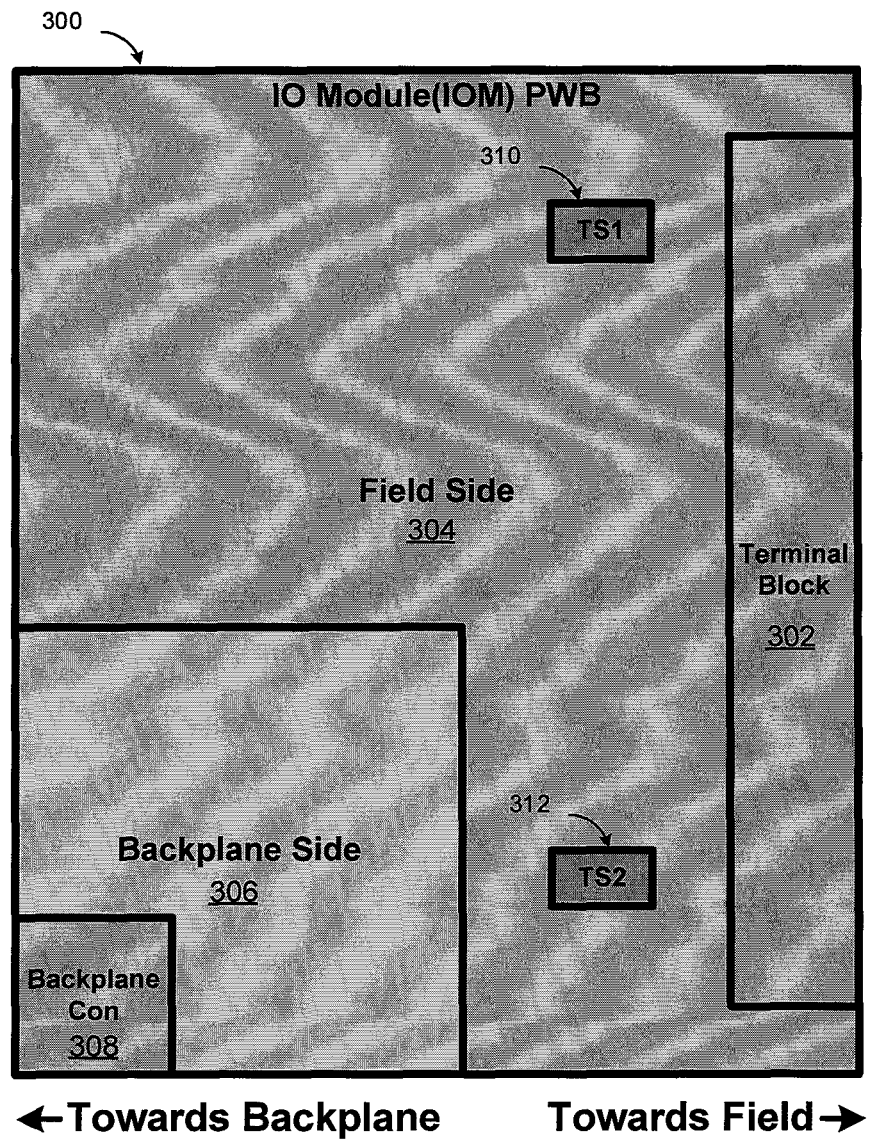
FIG. 3 illustrates an example block diagram of an IOM printed wiring board (PWB) according to this disclosure.

FIG. 3 illustrates an example block diagram of an IOM printed wiring board (PWB) 300 according to this disclosure. For ease of explanation, the IOM PWB 300 is described as being supported by the industrial process control and automation system 100 of FIG. 1. However, the IOM PWB 300 could be supported by any other suitable system. At least parts of the IOM PWB 300 can be coupled to an operator station through a device, such as the device 200 as shown in FIG. 2.

In FIG. 3, the IOM PWB 300 includes a terminal block 302, field side 304, backplane side 306, and backplane connector 308. The IOM PWB 300 can also include temperature sensors 310-312. While only two temperature sensors are shown, more or fewer sensors can be used. One or more of the components used herein can be implemented as part of processing circuitry, instructions on a non-transitory computer readable medium, as a processor, and the like.

In one embodiment, the IOM PWB 300 has two temperature sensors 310-312 located on the field side 304 of the IOM PWB 300. Each sensor 310-312 is configured to read a surface temperature, which is a function of the power delivered through I/Os located near the sensor. As more and more I/Os are configured as outputs and drive higher loads, the IOM PWB 300 is expected to dissipate more power and thus increase the IOM PWB 300 temperature. These sensors 310-312 read the ambient temperature around these I/Os configured as outputs.

The IOM PWB 300 configures I/Os as either input or output. In some embodiments, the IOM PWB 300 can have 8 or 16 I/Os distributed from a top edge to a bottom edge of the IOM PWB 300. In other embodiments, different numbers of I/Os can be used. In this example, two temperature sensors (TS1 310 and TS2 312) are located in the middle of a first set (4 or 8) of channel circuits (not shown) and a second set (4 or 8) of channel circuits (not shown), respectively. These sensors 310-312 measure the surface temperature of the IOM PWB 300. If the I/Os configuration (input or output) includes outputs, based on the drive current, there will be on-board power dissipation. The power dissipation can increase the temperature in that area. With periodic temperature measurement, through these sensors 310-312 and computer algorithms, the heat rise compared to a channel configuration/drive can be determined.

Although FIG. 3 illustrates one example of an IOM PWB 300, various changes may be made to FIG. 3. For example, components could be added, omitted, combined, further subdivided, or placed in any other suitable configuration according to particular needs. Also, computing devices can come in a wide variety of configurations, and FIG. 3 does not limit this disclosure to any particular configuration of an IOM PWB.

Figure 4:
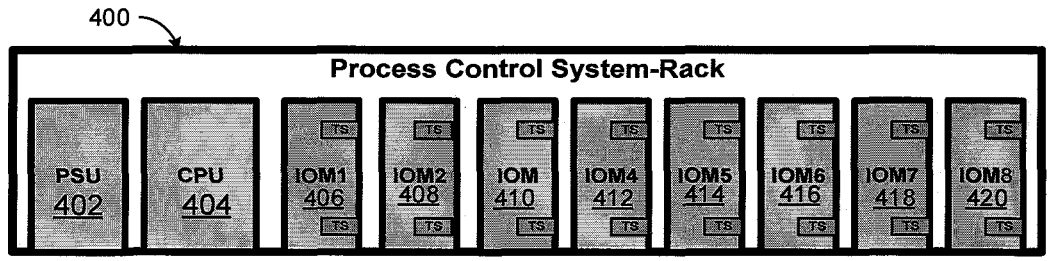
FIG. 4 illustrates an example block diagram of a rack according to this disclosure.

FIG. 4 illustrates an example block diagram of a rack 400 according to this disclosure. For ease of explanation, the rack 400 is described as being supported by the industrial process control and automation system 100 of FIG. 1. However, the rack 400 could be supported by any other suitable system.

In FIG. 4, the rack 400 can include a power supply unit (PSU) 402, CPU 404, and IOMs 406-420. Each of the eight IOMs 406-420 in the rack 400 includes two temperature sensors, one located towards a top edge and the other towards a bottom edge of the IOM. With this setup, the system 100 can measure the temperature in different areas of the rack 400 by averaging the temperature measured by all sensors.

Although FIG. 4 illustrates one example of a rack 400, various changes may be made to FIG. 4. For example, components could be added, omitted, combined, further subdivided, or placed in any other suitable configuration according to particular needs. Also, racks can come in a wide variety of configurations, and FIG. 4 does not limit this disclosure to any particular configuration of a rack.

Figure 5:
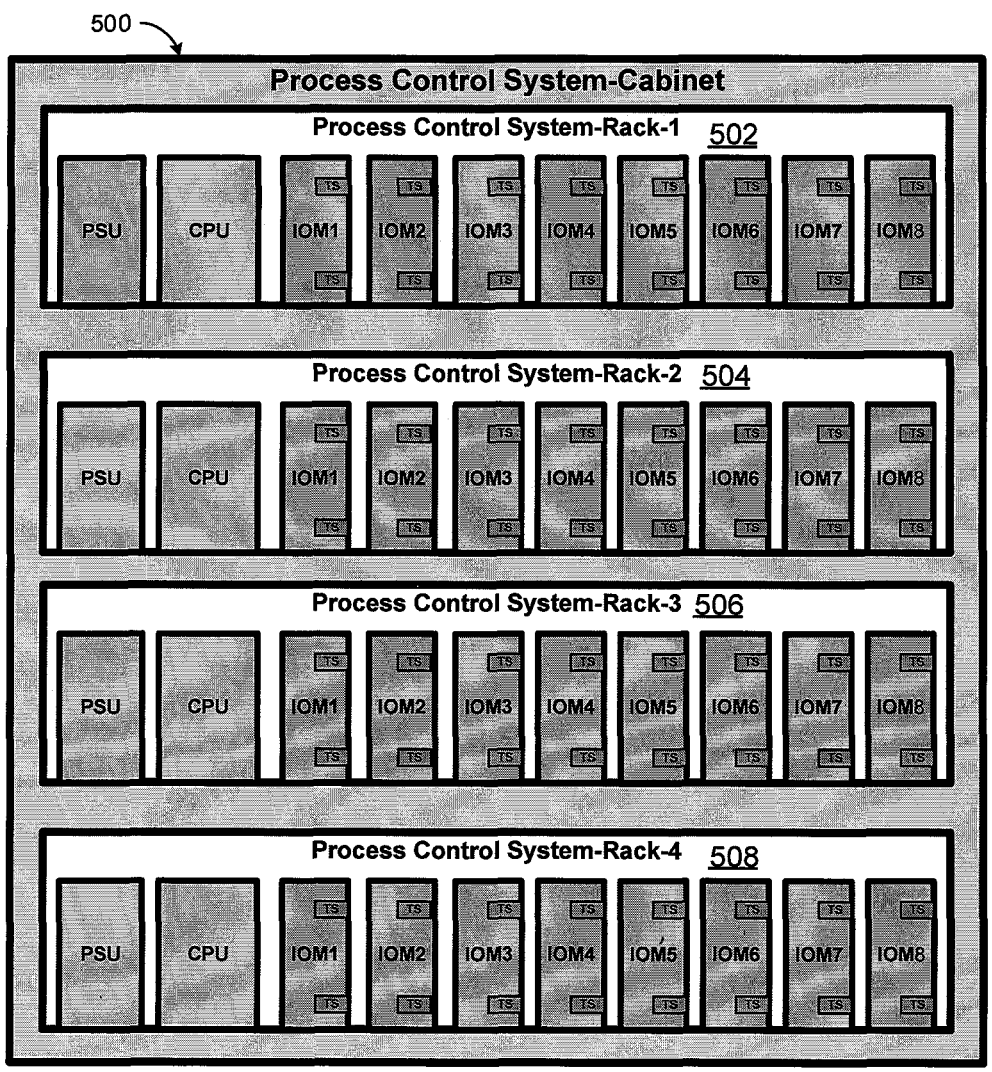
FIG. 5 illustrates an example block diagram of a cabinet according to this disclosure.

FIG. 5 illustrates an example block diagram of a cabinet 500 according to this disclosure. For ease of explanation, the cabinet 500 is described as being supported by the industrial process control and automation system 100 of FIG. 1. However, the cabinet 500 could be supported by any other suitable system.

In FIG. 5, the cabinet 500 can include multiple racks 502-508, each rack including a PSU, a CPU, and IOMs. Each of the eight IOMs in each of the four racks 502-508 in the cabinet 500 includes two temperature sensors, one located towards a top edge and the other towards a bottom edge of the IOM. With this setup, the system 100 can measure the temperature in different areas of the cabinet 500 by averaging the temperature measured by all sensors.

Although FIG. 5 illustrates one example of a cabinet 500, various changes may be made to FIG. 5. For example, components could be added, omitted, combined, further subdivided, or placed in any other suitable configuration according to particular needs. Also, cabinets can come in a wide variety of configurations, and FIG. 5 does not limit this disclosure to any particular configuration of a cabinet.

Figure 6:
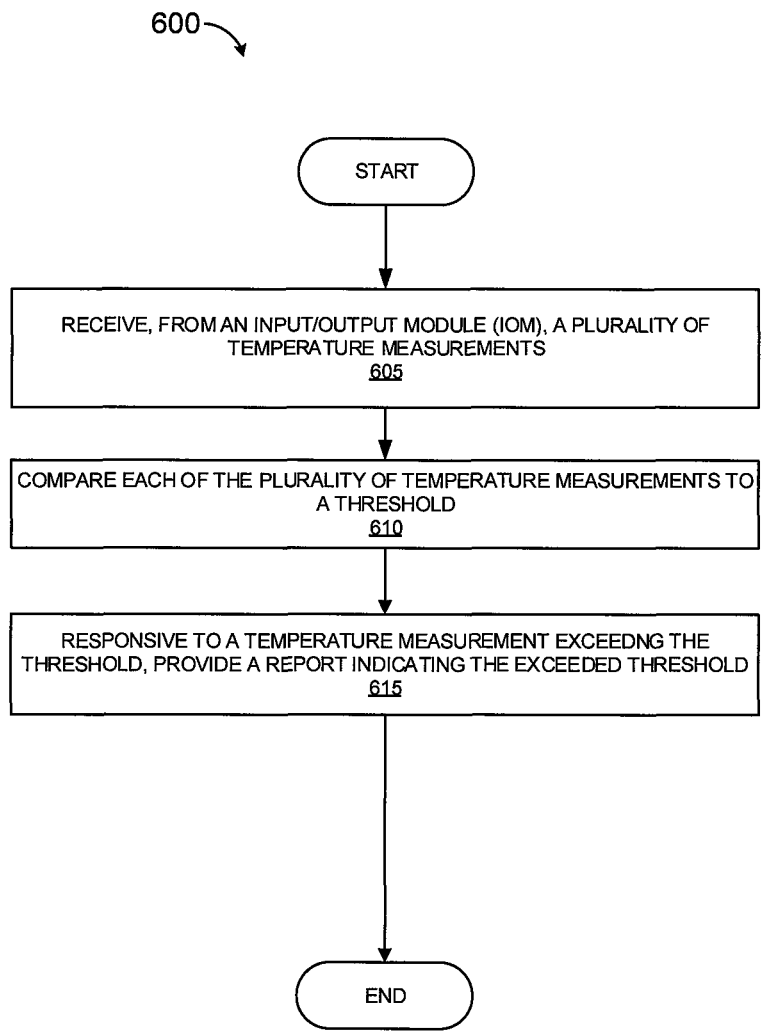
FIG. 6 illustrates an example process for managing IOM temperatures according to this disclosure.

FIG. 6 illustrates an example process 600 for managing IOM temperatures according to this disclosure. Process 600 can be executed within device 200 of FIG. 2.

At operation 605, a processor is configured to receive, from an IOM, a plurality of temperature measurements. In one embodiment, the processor can receive additional temperature measurements from a plurality of other temperatures sensors. For example, the processor may receive measurements from an entire rack or cabinet of IOMs.

At operation 610, a processor is configured to compare each of the plurality of temperature measurements to a threshold. The threshold may be set to a user defined setting. The threshold may also be set based on industry standards. The threshold can be based on dangerous or undesirable temperatures. In one example, there may be multiple thresholds. One threshold may be associated with a dangerous heat level, while another threshold may be associated with a degraded or broken fan.

At operation 615, a processor is configured, responsive to a temperature measurement exceeding the threshold, to provide a report indicating the exceeded threshold. The report can be provided to an operator through a display. The report can also identify a spread of the temperature across the IOM, rack, or cabinet. With the spread of temperature, such as indicated by a heat map, direct readings on a display, and/or readings on a diagram of the IOM, rack, or cabinet, an operator can make adjustments to the inputs and outputs of the IOMs in the rack or cabinet to more evenly spread the temperature across the IOM, rack, and/or cabinet. The report can also include a recommendation of placement of a plurality of inputs or outputs in each of the IOMs. The report can also provide for the temperature of the rack to be evenly spread through the rack. The report can also identify degradation of a fan in the rack based on the exceeded threshold.

As discussed herein, one or more steps can be performed by a processor or different components controlled by the processor. However, the processor can directly perform the steps performed by components controlled by the processor.

Although FIG. 6 illustrates one example of a process 600 managing temperature in an industrial process control and automation system, various changes may be made to FIG. 6. For example, while FIG. 6 shows a series of steps, various steps could overlap, occur in parallel, occur in a different order, or occur any number of times. In addition, the process 600 could include any number of requests.

In some embodiments, various functions described above are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed:

1. A system comprising:
    a processing device;
    a rack; and
    a plurality of input/output module (IOM) configured to interface with a field device in an industrial process control and automation system,
    wherein each IOM of the plurality of IOMs comprises:
        a terminal block including a plurality of inputs or outputs, each of the inputs or outputs configured to send and receive signals to and from the field device;
        a plurality of temperature sensors, each of the plurality of temperature sensors configured to measure a temperature in the vicinity of the temperature sensor within each IOM;
        a connector configured to transmit the temperature measured by each of the plurality of temperature sensors to the processing device,
    wherein the processing device compares each of the plurality of measured temperatures to a threshold,
    wherein the plurality of temperature sensors are positioned evenly across a field side of the IOM and the temperature measured evenly across the rack where the plurality of IOMs are positioned, and
    wherein the rack is configured to mount each of the plurality of IOMs, and the processing device.

2. The system of claim 1, wherein the processing device is configured to send a report of the temperatures to an operator station,
    wherein the report includes the temperature measured evenly across the rack where the plurality of IOMs are positioned.

3. The system of claim 1, further comprising:
    a cabinet configured to mount the rack and a plurality of other racks,
    wherein each of the plurality of other racks includes IOMs and a processing device, each IOM including a plurality of temperature sensors.

4. The system of claim 3, wherein the processing device of the rack and the processing devices of each of the plurality of other racks are configured to send a report of the temperatures to an operator station,
    wherein the report includes the temperature measured by the plurality of temperature sensors of the IOM and of other IOMs evenly across the rack where the IOM and plurality of other IOMs are positioned.

5. The system of claim 2, wherein the report includes a recommendation of placement of the plurality of inputs or outputs in each of the IOMs.

6. The system of claim 2, wherein the report includes a recommendation of a placement of the plurality of inputs or outputs in each of the IOMs, wherein the placement provides for the temperature of the rack to be evenly spread through the rack.

7. A method comprising:
    receiving, from a plurality of temperature sensors coupled to an input/output module (IOM) in an industrial process control and automation system, a plurality of temperature measurements, wherein each of the plurality of temperature sensors configured to measure a temperature in the vicinity of the temperature sensor within the IOM, wherein the IOM interfaces with a field device in the industrial process control and automation system by using a plurality of inputs or outputs to send and receive signals to and from the field device;
    comparing each of the plurality of temperature measurements to a threshold; and
    responsive to a temperature measurement exceeding the threshold, providing a report indicating the exceeded threshold,
    wherein the plurality of temperature sensors are positioned evenly across a field side of the IOM and the temperature measured evenly across a rack where a plurality of IOMs are positioned.

8. The method of claim 7, wherein the report identifies a spread of the temperature across the IOM.

9. The method of claim 7, further comprising:
    receiving a plurality of additional temperature measurements from a processing device of the rack, the rack including the plurality of IOMs.

10. The method of claim 9, wherein the report identifies a spread of the temperature across the rack.

11. The method of claim 9, wherein the rack is one of a plurality of racks in a cabinet.

12. The method of claim 11, wherein the report identifies a spread of the temperature across the cabinet.

13. The method of claim 7, wherein the report includes a recommendation of placement of a plurality of inputs or outputs in each of the IOMs.

14. The method of claim 10, wherein the report includes a recommendation of a placement of a plurality of inputs or outputs in each of the IOMs, wherein the placement provides for the temperature of the rack to be evenly spread through the rack.

15. The method of claim 9, further comprising:
    identifying degradation of a fan in the rack based on the exceeded threshold.

16. An input/output module (IOM) for interfacing with a field device, the IOM comprising:
    a terminal block including a plurality of inputs or outputs, each of the inputs or outputs configured to send and receive signals to and from the field device;
    a plurality of temperature sensors, each of the plurality of temperature sensors configured to measure a temperature in the vicinity of the temperature sensor within the IOM; and
    a connector configured to transmit the temperature measured by each of the plurality of temperature sensors to a processing device,
    wherein the processing device compares each of the plurality of measured temperatures to a threshold, and
    wherein the plurality of temperature sensors are positioned evenly across a field side of the IOM and the temperature measured evenly across a rack where a plurality of IOMs are positioned.

17. The IOM of claim 16, wherein the IOM is included in and coupled to the rack.

18. The IOM of claim 17, wherein the processing device is part of the rack and receives temperatures from a plurality of other IOMs.

\* \* \* \* \*